United States Patent

[11] 3,603,164

[72] Inventor Itsuki Ban
829, Higashi-Oizumimachi, Nerima-ku,
Tokyo, Japan
[21] Appl. No. 8,168
[22] Filed Feb. 3, 1970
[45] Patented Sept. 7, 1971

[54] APPARATUS FOR SHIFTING MAGNETIC HEAD IN MULTITRACK TAPE PLAYER
8 Claims, 6 Drawing Figs.

[52] U.S. Cl. .......... 74/54, 74/56, 179/100.2 CA
[51] Int. Cl. .......... F16h 25/08, F16h 25/12, G11b 5/00
[50] Field of Search .......... 179/100.2 CA, 100.2 MD; 74/54, 57, 190.5

[56] References Cited
UNITED STATES PATENTS

| | | | |
|---|---|---|---|
| 142,903 | 9/1873 | Dollbler | 74/56 |
| 963,638 | 7/1910 | Packer | 74/54 |
| 2,312,798 | 3/1943 | Carrington | 74/190.5 |
| 2,667,193 | 1/1954 | Sherman | 74/54 |
| 3,278,694 | 10/1966 | Pastor et al. | 179/100.2 |
| 3,370,131 | 2/1968 | Reed | 179/100.2 |
| 3,376,396 | 4/1968 | Bradt et al. | 179/100.2 |

*Primary Examiner*—William F. O'Dea
*Assistant Examiner*—Wesley S. Ratliff, Jr.
*Attorney*—Jacobs & Jacobs

ABSTRACT: An apparatus for shifting magnetic head in multitrack tape player includes cam means for shifting a magnetic head across the width of the tape to positions corresponding to record-tracks on the tape, and driving means for rotatably driving said cam means at a predetermined angle. Said driving means comprises a frictional wheel rotatably driven by a capstan for drivingly feeding the tape, and means for decelerating rotation of the frictional wheel and imparting the same to said cam means. The frictional wheel is adapted to be prevented from its rotating due to less power transmission from the capstan when the frictional wheel rotate round its axis.

APPARATUS FOR SHIFTING MAGNETIC HEAD IN MULTITRACK TAPE PLAYER

BACKGROUND OF THE INVENTION

This invention relates to a multitrack tape player, and more particularly to an apparatus for shifting a magnetic head to play a plurality of record-tracks on the magnetic tape.

One type of conventional magnetic head-shifting apparatus applied to the multitrack or multi channel magnetic tape player is composed of rotary cam for shifting the magnetic head across the width of the tape with the magnetic head synchronizing with record-tracks, a ratchet wheel rotatable with the cam, and an electromagnetic plunger gradually and rotatably driving the cam. More specifically, an actuator for the plunger is reciprocated by energizing the plunger in pulse fashion whereby the cam is shifted through the ratchet wheel in single steps to position the magnetic head to successive record-track positions. The electromagnetic plunger used in the magnetic head shifting apparatus relatively consumes much current to the extent of 10 - 20 watts. If it is required to use in the cam a rotary switch which is for lit controlling of lamp indicating the record-track to be played or another control mechanism, the plunger is required to rely on much current. This is the tendency of the plunger in use. For this reason, such magnetic head-shifting apparatus could be hardly used in a portable magnetic tape player utilizing battery as source. It is also a problem in view of a space to use in the tape player the electromagnetic plunger since it is large sized. In order to securely maintain a relative position of the magnetic head to the record-track to be played, it is necessary to maintain a relative position of the cam to the magnetic head. This means that magnetic head should be biased by heavy bias against the cam, and that slidable frictional force between the cam and members supporting the magnetic head is increased. Accordingly, the plunger is required to be more current and large sized in order to securely position the magnetic head to a position corresponding to the record-track to be played. Due to impact sound derived from the plunger in use, it is undesirable to use such electromagnetic plunger in sound and music instruments, particularly in case of the large plunger.

SUMMARY OF THE INVENTION

It is a main object of the invention to provide an apparatus for shifting magnetic head in multitrack tape player, which is capable of rotatably driving cam means for shifting a magnetic head to a position corresponding to record-track on the tape by use rotational force of a rotary capstan for drivingly rotating the magnetic tape.

Another object of the invention is to provide an apparatus for shifting magnetic head in multitrack tape player, wherein a frictional wheel is rotatably mounted to a swingable lever and driven by the capstan when it is urged thereby in shifting the magnetic head, and cam means is rotatably driven by decelerating and transmitting rotation of the frictional wheel to cam means.

A further object of the invention is to provide an apparatus for shifting magnetic head in multitrack tape player, wherein abutment force of the frictional wheel against the capstan is caused to decay when the frictional wheel makes one rotation round its axis to automatically stop rotation of the frictional wheel while cam means is rotated at a predetermined angle to move the magnetic head in single step.

Still another object of the invention is to provide an apparatus for shifting magnetic head in multitrack tape player, wherein an electromagnetic device controls operation of keeping means which maintain the swing lever to a position where the frictional wheel does not receive rotational force of the capstan, in response to controlling current supply to the electromagnetic device in pulse manner the swing lever is swung to a position where the frictional wheel abuts against the capstan and rotation of the frictional wheel is initiated to move the magnetic head.

Different from above mentioned conventional apparatus in which the magnetic head is moved by utilizing reciprocating movement of the actuator for the electromagnetic plunger for rotation of the cam, the apparatus for shifting magnetic head according to the present invention the electromagnetic device does not rely on cam means as power source to rotate cam means so that less current is required and that cam means is rotated by use of rotational force of the capstan thereby using in the tape player employing battery as source. And, advantages derived from the use of the electromagnetic device is that heavy rotational force may be obtained for rotation of cam means and that impact sound is not produced in movement of the magnetic head.

Other objects, features and advantages of the invention will be understood from the following description in conjunction with the accompanying drawing, wherein:

DESCRIPTION OF THE PREFERRED EMBODIMENTS

Figure 1:
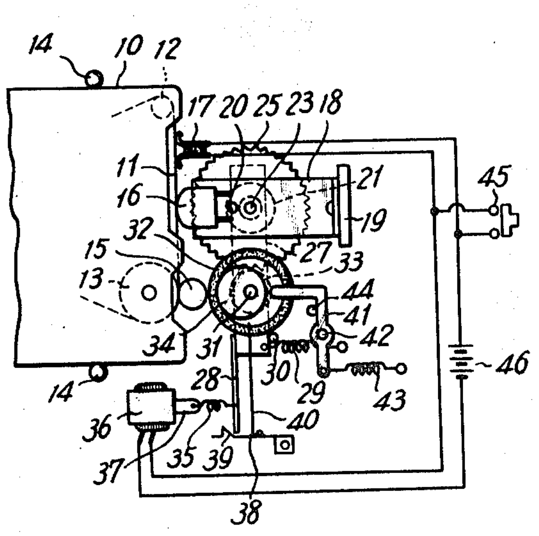
FIG. 1 is a plan view of an endless magnetic tape cartridge player to which is applied an apparatus for shifting magnetic head according to the invention.

A multitrack endless magnetic tape cartridge player is shown in FIG. 1, with partially being broden away, to which is employed one embodiment of an apparatus for shifting magnetic head according to the present invention, and numeral 10 designates an endless magnetic tape cartridge which is located in a predetermined playing position under the control of guides 14. The tape cartridge 10 includes a generally rectangular container with a centrally disposed reel assembly (not shown) on which an endless magnetic tape 11 is wound and unwound in conventional manner. The tape 10 passes over a guide 12 and a pinch roller 13. The guide 12 and the pinch roller 13 are disposed adjacent the leading edge of the cartridge whereat the cartridge sidewall is cut away or disposed with and the tape 11 is extended from the center of the hub of the reel (not shown) about the guide 12 and thence about the pinch roller 13 back to the outer periphery of a roll formed by the tape wound about the hub. Included in the tape thereon are a plurality of parallel record-tracks (not shown). In opposition to the leading edge of the cartridge 10 located in the playing position there are provided on a deck (not shown) of the tape player a capstan 15, a magnetic head 16, and an endmark detector or sensing means 17. The capstan 15 is connected to an electrical motor (not shown) and rotatably driven at a preset constant speed. The capstan 15 firmly presses the tape 11 against the pinch roller 13 in its drive relation. The tape 11 which has been driven by the pinch roller 13 and the capstan 15 is fed passing over the magnetic head 14, and the endmark detector 17.

Figures 2, 3:
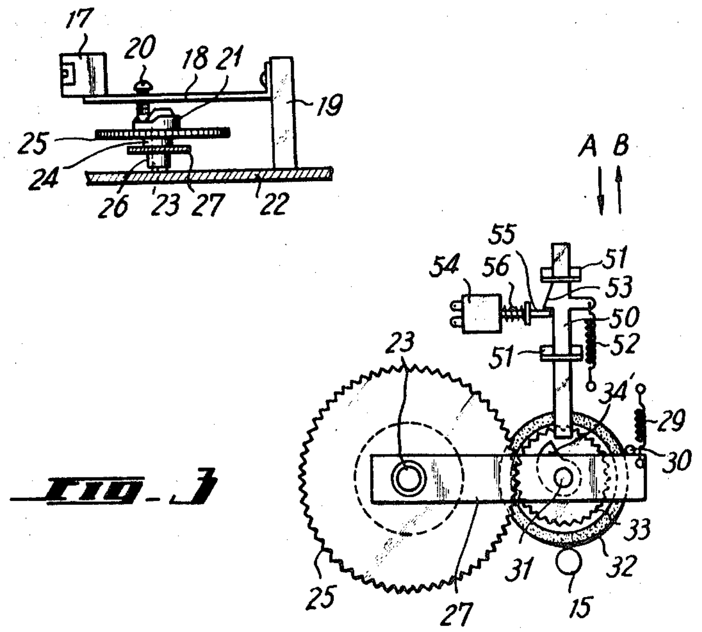
FIG. 2 is an enlarged side view of vicinity of the magnetic head with cam means shown in FIG. 1.
FIGS. 3 to 6 are plan view of different embodiment of means for rotatably driving cam means.

By means of an apparatus for shifting magnetic head according to the invention as will be described hereinafter, the magnetic head 16 may be positioned at a plurality of different predetermined fixed points across the width of the tape 11, thereby reproducing a plurality of discrete and separate record-tracks upon the tape at these points. The magnetic head 16 is firmly secured to L-shaped support plate or leaf spring 18 which one end portion is fixed to a stable member 19 on the deck (not shown). A threaded pin 20 is held in a threaded aperture (not shown) of the leaf spring 18. The rounded bottom end of the threaded pin 20 is arranged to ride on a stepped face cam 21 (see FIG. 2). The leaf spring 18 is given the bias which urges the free and thereof downwardly, to maintain the pin 20 and the face cam 21 is operative relation. The cam 21 is arranged to shift the magnetic head 16 into a plurality of discrete record-tracks on the tape 11. The cam 21, as seen in FIG. 2, comprises a plurality of flat steps which face to the respective record-tracks on the tape along the peripheral face thereof and are different to one another in elevation, as seen in FIG. 2. Ramps are provided between the flat steps of the cam 21. The lowest flat step of the cam 21 positions the magnetic head 17 at the lowest record-track on the tape 11. The threaded pin 20 assures this. As will be detailed later, when the cam 21 is rotated by one step by cam driving means, the threaded pin 20 rides up the adjacent ramp to the next flat step of the cam. The details of driving means for the cam 21 will be apparent from the foregoing description with reference to FIGS. 1 and 2. Similar numerals are used to illustrate like parts in FIGS. 1 and 2.

The cam 21 is rotatably supported by a sleeve 24 over a vertically extending shaft 23 mounted to a deck 22. A gear 25 is mounted with the face cam 21 to the sleeve 23. A swing lever 27 is swingably supported by a further sleeve 26 over the shaft 23. The swing lever 27 is provided at an end portion thereof with a leaf spring 28 and is urged in the counterclockwise direction by a tension spring 29 but inward movement of the swing lever is limited by a stopper pin 30 on the deck. A rubber-covered frictional wheel 32 is supported by an axis 31 pivotally mounted to the swing lever 27. The frictional wheel 32 as will be described later is caused to abut against the capstan 15 by rotation of the swing lever 27 from the position as shown to the clockwise direction and is rotatably driven by the capstan 15. A gear 33 and an eccentric cam 34 are supported with the frictional wheel 32 by the axis 31. The gear 33 is adapted to mesh with the gear 25. The gears 33 and 25 constitute a reducing gearing and rotation of the frictional wheel 32 is reduced to be imparted to the face cam 21. A spring 35 is stretched between the leaf spring 28 and an actuator 37 of an electromagnetic plunger 36. When a pulse of current is supplied to the plunger 36, the swing lever 27 is rotated clockwise against the bias of the tension spring 29. This causes the frictional wheel 32 to abut with the capstan 15 to initiate rotation of the cam 21. At this moment, the one end of the leaf spring 28 is engaged by a bent portion 39 integrally formed in a leaf spring 38 one end of which is mounted on the deck 22. With this arrangement, after the plunger 36 is deenergized the swing lever 27 is held in its position against the bias of the spring 29 so that the cam 21 keeps its rotation. Rigidly mounted to the leaf spring 38 at the center thereof is a leaf spring 40 one end of which faces to the periphery of the eccentric cam 34. Pivotally mounted to a pin 42 on the deck 22 is a substantially L-shaped lever 41 one end of which faces to the periphery of the eccentric cam 34. The lever 41 is biased by a spring 43 in the counterclockwise direction and movement of the lever 41 is limited by a stopper pin 44 on the deck 22. The plunger 36 is connected through the parallel connection between the endmark detector 17 and a pushbutton switch 65 in series to an electrical source 46. The endmark detector 17 consists of two feeler contacts that are shorted by a conductive patch (not shown) provided on the tape 11 and member of insulation for supporting the contacts.

The operation of the apparatus for shifting magnetic head according to the invention shown in FIGS. 1 and 2 will be understood from the foregoing description. The plunger 36 is energized the fact that the two feeler contacts of the endmark detector 17 are shorted by the conductive patch (not shown) on the tape 11 or the pushbutton switch 45 is manually closed. Upon energizing the plunger 36, the swing lever 27 is swung by the bias of the spring 29 to a position where the frictional wheel 32 abuts against the capstan 15. Abutment between the frictional wheel 32 and the capstan 15 may be maintained even after the plunger 36 is deenergized since the swing lever 27 is retained by engagement of the leaf spring 28 with the bent portion 39 of the leaf spring 38. Abutment of the frictional wheel 32 against the capstan 15 rotates the former in the direction of the arrow as shown and the gear 33, the eccentric cam 34 are rotated with the frictional wheel 32. Rotation of the gear 33 is decelerated and imparted through the gear 25 to the face cam 21. In the course of rotation of the eccentric cam 34, the periphery thereof initiates its slidable contact to the one end of the lever 41 to pressedly rotate the lever 41 against the bias of the spring 43. By reaction that the lever 41 is pressedly rotated by the eccentric cam 34, the frictional wheel 32 is strongly urged against the capstan 15 to secure power transmission. On the other hand, in the course of one rotation of the eccentric cam 34, the one end of the leaf spring 40 comes in a slidable contact with the periphery of the eccentric cam 34 and the leaf spring 38 is pressedly moved to a position where the bent portion 39 is disengaged from the leaf spring 28. Therefore, the swing lever 27 is released from retention by the leaf spring 38. However, the swing lever 27 is not returned by the bias of the tension spring 43 to its original position to thereby maintain abutment of the frictional wheel 32 against the capstan 15 since the swing lever 27 is biased in the clockwise direction by the bias of the spring 43. When the frictional wheel 32 rotates nearly around its axis, the lever 41 is prevented from its rotation by the stopper pin 44 so that the bias of the spring 43 does not affect the swing lever 27. For this reason, the frictional wheel 32 is rotated at slightest angle, the swing lever 27 is returned by the bias of the tension spring 43 to a position where the frictional wheel 32 is away from the capstan 15. It will be understood from the foregoing description that the frictional wheel 32 is rotated at each time a pulse of current is supplied from the source 46 to the plunger 36. If the ratio of gear to the gear 23 and the gear 25 is designed to be 1 : 4 the face cam 21 is rotated at angle of 90°when the frictional wheel 32 completely rotates around its axis. Accordingly, the flat steps of the face cam 21 are spaced at angle of 90°to be four in number, the magnetic head 17 is shifted by one step when the plunger 36 is actuated. In other words, the magnetic head 17 may be positioned at four different predetermined fixed points across the width of the tape 13.

It will be understood that, by the use of the apparatus for shifting magnetic head according to the present invention, rotation volume of the face cam 21 in response to one rotation of the frictional wheel 32 may be varied by changing the ratio of gear to the gear 33 and the gear 25.

Another embodiment of driving means for the face cam 21 is shown in FIG. 3 in which similar numerals are used to illustrate like parts functioning same as those in FIGS. 1 and 2.

Slidably provided on a deck (not shown) by guides 51 is a lever 50 one end of which faces to a cam 34′ mounted to the axis 31 common to the frictional wheel 32. The lever 50 is biased by a tension spring 52 in the direction of arrow A and is normally retained at a position as shown by engaging a hook portion 53 with the end of an actuator 55 of an electromagnetic plunger 54. The plunger 54, as in the same manner of the plunger 36 (FIG. 1) is energized by the fact that the two feeler contacts of the endmark detector 17 is shortened by the conductive patch on the tape 17 or the push button switch 45 is closed. When the plunger 54 is energized the actuator 55 is attracted against the bias of a spring 56 to a position where it is released from the hook portion 53 of the lever 50. As a result, the lever 50 is slided by the bias of the spring 52 in the direction of arrow A, and the end of the lever 50 comes in contact with the minimum deformed portion of the cam 34′ to rotate the swing lever 27 by means of the cam 34′ in the clockwise direction against the bias of tension spring 29. With this rotation of the swing lever 27, the frictional wheel 32 abuts against the capstan 15 and is rotated by the capstan in the direction of the arrow as shown. As the frictional wheel 32 is rotated, the gear 33 and the cam 34′ are bodily rotated. As the cam 34′ is rotated, the lever 50 is controlled by the cam 34′ and is slided in the direction of arrow B against the spring 52. When the cam 34′ is rotated to a position where the maximum deformed portion of the cam 34′ comes in contact with the end of the lever 50, the lever 50 is moved to a position where the hook portion 53 engages the actuator 55 of the plunger 54. When the cam 34′ fully rotates about its axis and the maximum deformed portion passes over the end of the lever 50, the lever 15 is disconnected from the cam 34′ and the swing lever 27 is returned to its original position by the bias of the tension spring 29 whereby the frictional wheel 32 is away from the capstan 15. On the other hand , the lever 50 is retained by the actuator 55 of the plunger 54 at the position as shown. That is, the frictional wheel 32 fully rotates about its axis whenever the plunger 54 is energized in pulse fashion. Since rotation of the frictional wheel 32 is decelerated and imparted through the gears 33, 35 to the face cam 21, the face cam 21 is rotated at a predetermined angle at each time the plunger 54 is energized in pulse fashion.

Figure 4:
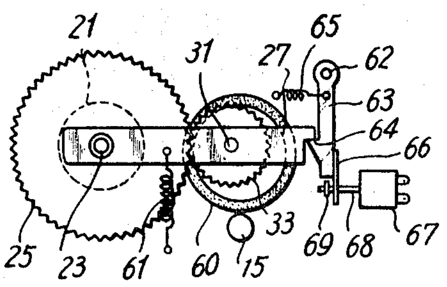

A further embodiment of driving means for the face cam 21 is shown in FIG. 4 in which similar numerals are used to illustrate like parts functioning same as those in FIG. 1. A frictional wheel 60 and the gear 33 are rigidly mounted to the axis 31 pivotally mounted to the swing lever 27. The frictional wheel 60 is different from the frictional wheel 32 and a portion away from the center of the wheel is fixed to the axis 31. The swing lever 27 is given a clockwise rotational force by a tension spring 61. Rotation of the swing lever 27 is normally arrested by engaging the free end of the spring lever 27 with a hook portion 64 of a latch lever 63 swingably supported by a pin 62 on a deck (not shown). The latch lever 63 is given the counterclockwise rotational force by a spring 65. An actuator 68 of an electromagnetic plunger 67 passes through a hole (not shown) formed on the bend portion 66 of the latch lever 63. When the plunger 67 is energized in pulse fashion, the actuator 68 is attracted and the latch lever 63 is rotated through a flange 69 formed on the actuator 68 against the bias of the spring 27 to disengage the hook portion 64 from the swing lever 27. As a result, the swing lever 27 is clockwise rotated by the bias of the tension spring 61 and thus the frictional wheel 60 abuts against the capstan 15 and is then drivingly rotated in the direction of the arrow as shown. Since a portion away from the center of the frictional wheel 60 is firmly mounted to the axis 31, the swing lever 27 is swung as the frictional wheel 60 is rotated. When the frictional wheel 60 is about to rotate round its axis, the end of the swing lever 27 engages the hook portion 64 of the latch lever 63 so that the swing lever 27 is again retained by the latch lever 63. When the frictional wheel 60 is further rotated at a certain angle to make a revolution from the starting point, abutment force of the frictional wheel 60 against the capstan 15 is caused to be zero to stop rotation of the frictional wheel 60. That is, the frictional wheel 60 makes one rotation whenever the plunger 67 is energized in pulse fashion. Rotation of the frictional wheel 60 is decelerated and is imparted through the gears 33, 25 to the face cam 21.

Figure 5:
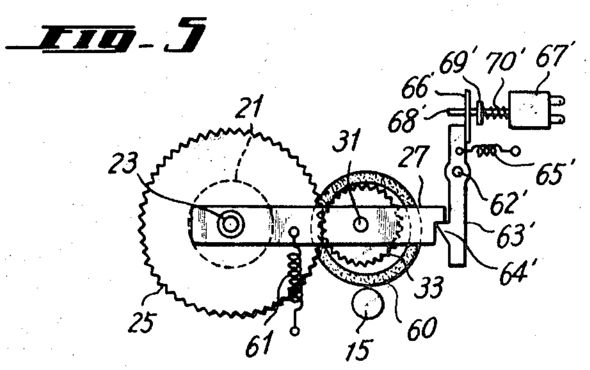

Another embodiment of driving means for the face cam 21 is shown in FIG. 5 in which like reference numerals designate like or corresponding parts in FIG. 4. A latch lever 63′ corresponding to the latch lever 43 (FIG. 4) is swingably provided to a pin 62′ on a deck (not shown) and is given the clockwise rotational force by a spring 65′. The latch lever 63′ includes a hook portion 64′ engageable with the free end of the swing lever 27, and a bend portion 66′. An actuator 68′ of an electrical plunger 67′ passes through a hole (not shown) formed on the bend portion 86′. The actuator 68′ is attracted against the bias of a spring 70′ when the plunger 67′ is energized. FIG. 5 shows the plunger 67′ is in an energized condition. The swing lever 27 is engaged by the latch lever 63′ when the plunger 67′ is energized. Deenergization of the plunger 67′ causes the actuator 68′ to be projected by the bias of the spring 70′ and thus a flange 69′ on the actuator 68′ comes in contact with the bend portion 66′. In this manner, the latch lever 63′ is moved against the bias of the spring 65′ to a position where it is released from the swing lever 27. The swing lever 27 which has been released from the latch lever 63′ is clockwise rotated by the bias of the tension spring 61 to allow the frictional wheel 60 to abut against the capstan 15 and rotated thereby. The plunger 67′ is adapted not to be supplied with current in pulse fashion by means of a control circuit (not shown) so that the plunger 67′ is adapted not to be supplied with so that the plunger 67′ may be energized immediately after deenergization thereof and the latch lever 63′ is returned to its original position while the frictional wheel 60 is rotated. When the frictional wheel 60 is about to make a full rotation around its axis, the swing lever 27 is again engaged by the latch lever 63′. And, where the frictional wheel makes a rotation, abutment of the frictional wheel 60 against the capstan 15 is caused to be zero to stop rotation of the frictional wheel 60 as previously explained by reference to FIG. 6.

Figure 6:
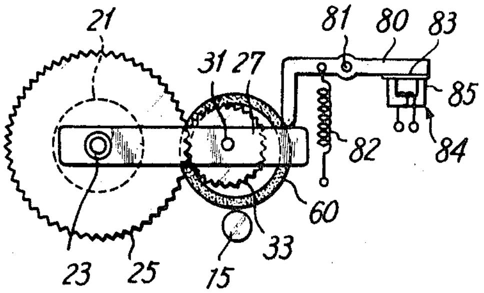

Still another embodiment of driving means from the face cam 21 is shown in FIG. 6, in which similar numerals are used to illustrate like parts in FIGS. 4 and 5.

A substantially L-shaped lever 80 is swingable mounted to a pin 81 on a deck (not shown) and has one end which faces to the side edge of the swing lever 27. The lever 80 is given the counterclockwise rotational force by a spring 82 and rotation of the lever 80 is prevented by the fact that a magnetic piece 83 secured to the end of the lever 80 is attracted to an electromagnet 84 fixed to the deck (not shown). Although the electromagnet is normally supplied with current, if it is not supplied with current in pulse manner, attractive force to the magnetic piece 83 decays so that the lever 80 is counterclockwise rotated by the bias of the spring 82. With swingable movement of the lever 80, the side edge of the swing lever 27 is depressed by the lever 80 and clockwise rotated to allow the frictional wheel 60 to abut against the capstan 15. As the frictional wheel is rotated by rotational force of the capstan 15, the swing lever 27 is caused to be swung. Just before the frictional wheel 60 makes one rotation round its axis, the swing lever 27 is moved to a position where the magnetic piece 83 contacts with an open end of a magnetic circuit of a core 85 of the electromagnet 84. By contact of the magnetic piece 83 with the open end of the magnetic circuit of the core 85 of the electromagnet 84, the magnetic circuit of the core 85 is closed to allow the electromagnet 84 to intensively attract the magnetic piece 83 whereby the lever 80 is retained against the bias of the spring 82. After the lever 80 has been retained by the electromagnet 84, the frictional wheel 60 is then rotated to make one rotation from the initial position so that abutment force of the frictional wheel 60 against the capstan 15 decays to stop rotation of the frictional wheel 60. That is, whenever the electromagnet 85 is cut off from supply of current in pulse fashion, the frictional wheel 60 makes one rotation round its axis with the face cam 21 being rotated at a predetermined angle.

It will be appreciated that the invention is not limited to use of the particular embodiments as described, but includes variants and alternatives within the spirit and scope of the claims.

What I claim is:

1. An apparatus for shifting magnetic head in multitrack tape player including a rotary capstan for driving a magnetic tape and at least one magnetic head adapted to transduce the tape, said apparatus comprising:

a displaceable support member coupled to the magnetic head for positioning it with respect to a plurality of dicrete and separate record-tracks on the tape;

cam means coactable with the support member for controlling displacement of the magnetic head to play the record-tracks, said cam means having a plurality of successive cam regions spaced apart in correspondence with the record-tracks, said cam regions being constracacted to displace the support member to corresponding positions when in individual coaction therewith and thereby position the magnetic head for play with associated record tracks;

driving means for rotating said cam means in single steps to position the magnetic head to successive record-track positions, said driving means including a swingably provided swing lever, a directional wheel rotatably mounted to said swing lever and rotatably driven said capstan when abutting thereagainst in response to swingable movement of said swing lever, and a reducing device for decelerating rotation of said frictional wheel and imparting the dame to said cam means, said reducing device having a reduction ratio such that said cam means in rotated by an angle corresponding to an angle between said cam regions adjacent to each other when said frictional wheel makes one rotation round control means for controlling swingable movement of said swing lever to the extend that said frictional wheel makes one rotation round its axis;

keeping means maintaining said swing lever to a position where rotation of said capstan is not transmitted to said frictional wheel after said frictional wheel has made one rotation round its axis;

an electromagnetic device for controlling operation of said keeping means, said keeping means being cut off from maintenance of said swing lever in response to control of current supply to said electromagnetic device in pulse fashion.

2. An apparatus for shifting magnetic head in accordance with claim 1, wherein said keeping comprises a tension spring biasing said swing lever in a direction that said frictional wheel is away from said capstan, and a stopper member limiting movement of said swing lever due to said tension spring at a position where said frictional wheel does not receive a rotational force of said capstan.

3. An apparatus for shifting magnetic head in accordance with claim 2, wherein said electromagnetic device is an electromagnetic plunger having an actuator connected to said swing lever, said actuator swinging said swing lever, when said plunger is energized in pulse fashion, against the bias of said tension spring to a position where said frictional wheel abuts against said capstan to cut off operation of said keeping means.

4. An apparatus for shifting magnetic head in accordance with claim 3, said control device comprises a cam rotatable with said frictional wheel, a lever slidably provided and one end of which faces to said cam, a spring one end of which biases said lever in the direction close to said cam, a stopper pin limiting movement of said lever due to said spring, a displaceable latch member retaining said swing lever swung to a position where said frictional wheel urges against said capstan by said electromagnetic plunger, and a member coupled to said latch member and having one end facing to said cam, said lever being moved against the bias of said spring upon rotation of said cam to allow said cam to abut against said lever at one end thereof, said swing lever being biased by reaction in a condition in which said frictional wheel urges against said capstan, said latch member being moved through said member by said cam to a position where it is released from said swing lever during one rotation of said cam, upon one rotation of said cam said lever being away from said cam while said swing lever is maintained by said keeping means.

5. An apparatus for shifting magnetic head in accordance with claim 2, wherein said control means comprises a cam rotatable with said frictional wheel, a lever slidably provided and one end of which faces to said cam, and a spring one end of which biases said lever in the direction close to said cam, said electromagnetic device comprises an electromagnetic plunger having an actuator one end of which engages a hook portion formed on said lever, upon energization of said plunger in pulse fashion said actuator being disengaged from said hook portion and said lever being swung by the bias of said spring to allow said lever at one end thereof to abut against a minimum deformed portion of said cam so that said swing lever being swung against the bias of said tension spring of said keeping means in a condition in which said frictional wheel is rotatably driven by said capstan, and as said cam is rotated with said frictional wheel said lever being returned to its original position against the bias of said spring and said cam makes one rotation to allow a maximum deformed portion thereof to be away from one end of said lever with said lever being retentioned by said plunger while said swing lever is maintained by said keeping means.

6. An apparatus for shifting magnetic head in accordance with claim 1, wherein said frictional wheel is rotatably mounted to said swing lever in a manner that it is away from the center thereof, said swing lever being swung with rotation of said frictional wheel.

7. An apparatus for shifting magnetic head in accordance with claim 6, wherein said control means is a tension spring biasing said swing lever in the direction in which said frictional wheel is urged against said capstan, said keeping means is a latch lever swingably provided and having a hook portion engageable with said swing lever, said electromagnetic device is an electromagnetic plunger having an actuator connected to said latch lever, upon controlling current supply to said plunger in pulse fashion said latch lever is instantly swung by said actuator in a position where it is released from said swing lever, upon release of said swing lever from said latch lever said swing lever is swung by the bias of said tension spring to a position where said frictional wheel is rotatably driven by said capstan, with rotation of said frictional wheel said swing lever is swung and again retained by said latch lever just before said frictional wheel makes one rotation, in response to engagement of said swing lever with said latch lever abutment force of said frictional wheel against said capstan being caused to decay thereby allowing said frictional wheel to make one rotation and accordingly stop its rotation.

8. An apparatus for shifting magnetic head in accordance with claim 6, wherein said control means comprises a lever swingably provided and having one end facing to the side edge of said swing lever, and a spring biasing said lever in the direction in which one end thereof abuts against said swing lever, said keeping means comprises a magnetic piece mounted to said lever, and an electromagnet as said electromagnetic device provided to face to said magnetic piece, when said electromagnet attractively retains said lever through said magnetic piece said swing lever is maintained in a condition in which said frictional wheel does not receive rotation of said capstan, when said electromagnet is deenergized in pulse fashion retention of said lever is released to allow said lever to depress said swing lever and to be swung by the bias of said spring while said frictional wheel is urged against said capstan and thus rotated, with rotation of said frictional wheel said swing lever is swung and said lever is also swung against the bias of said spring, just before said frictional wheel makes one rotation said lever is again retained through said magnetic piece by said electromagnet, in response to engagement of said swing lever with said electromagnet abutment force of said frictional wheel against said capstan being caused to decay thereby allowing said frictional wheel to make on rotation and accordingly stop its rotation.